US009087191B2

(12) United States Patent
Deasy et al.

(10) Patent No.: US 9,087,191 B2
(45) Date of Patent: Jul. 21, 2015

(54) METHOD AND SYSTEM FOR FACILITATING ISOLATED WORKSPACE FOR APPLICATIONS

(75) Inventors: Stephen Deasy, Brighton, MA (US); Craig Newell, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/595,881

(22) Filed: Aug. 27, 2012

(65) Prior Publication Data

US 2014/0059642 A1  Feb. 27, 2014

Related U.S. Application Data

(60) Provisional application No. 61/692,857, filed on Aug. 24, 2012.

(51) Int. Cl.
| | |
|---|---|
| G06F 21/00 | (2013.01) |
| G06F 21/54 | (2013.01) |
| G06F 9/445 | (2006.01) |
| G06F 21/31 | (2013.01) |
| G06F 21/60 | (2013.01) |
| G06F 21/53 | (2013.01) |
| H04W 12/02 | (2009.01) |
| H04L 29/06 | (2006.01) |
| H04W 12/00 | (2009.01) |

(52) U.S. Cl.
CPC ............ *G06F 21/54* (2013.01); *G06F 9/44521* (2013.01); *G06F 21/31* (2013.01); *G06F 21/53* (2013.01); *G06F 21/602* (2013.01); *G06F 21/604* (2013.01); *H04W 12/02* (2013.01); *G06F 2221/2107* (2013.01); *G06F 2221/2143* (2013.01); *G06F 2221/2149* (2013.01); *H04L 63/0272* (2013.01); *H04W 12/00* (2013.01)

(58) Field of Classification Search
None
See application file for complete search history.

(56) References Cited

U.S. PATENT DOCUMENTS

| | | |
|---|---|---|
| 6,026,235 A | 2/2000 | Shaughnessy |
| 6,212,632 B1 | 4/2001 | Surine et al. |
| 6,405,316 B1 | 6/2002 | Krishnan et al. |
| 6,463,583 B1 | 10/2002 | Hammond |

(Continued)

OTHER PUBLICATIONS

Apple Inc., "OS X ABI Mach-O File Format Reference", 2009, 42 pages.

(Continued)

*Primary Examiner* — Andrew Nalven
*Assistant Examiner* — Christopher Ruprecht

(57) ABSTRACT

A system maintains a workspace environment of enterprise applications on a mobile device. The system receives enterprise applications for installation on the mobile device, wherein functionality has been inserted into binary executables of the enterprise applications to force the enterprise applications to communicate with an application management agent to obtain a security policy including a validity time period value related to keeping the workspace valid. The application management agent provides cryptographic keys to the enterprise applications to share encrypted messages. Upon launching, an enterprise application stores a workspace expiration time value as an encrypted message. The workspace expiration time value is extended if the user continues its use or, by another enterprise application, if the other enterprise application is launched by the user before an expiration of the expiration time value. The application management agent requests authentication credentials from the user if the workspace expiration time value expires.

20 Claims, 6 Drawing Sheets

(56) References Cited

U.S. PATENT DOCUMENTS

| | | | |
|---|---|---|---|
| 6,529,985 | B1 | 3/2003 | Deianov et al. |
| 6,735,774 | B1 | 5/2004 | Krishnaswamy |
| 6,959,441 | B2 | 10/2005 | Moore |
| 7,111,323 | B1 * | 9/2006 | Bhatia et al. ............ 726/8 |
| 7,296,274 | B2 | 11/2007 | Cohen et al. |
| 7,552,446 | B1 | 6/2009 | Sosnovsky et al. |
| 7,565,665 | B2 | 7/2009 | Forin et al. |
| 7,792,546 | B2 | 9/2010 | Toy et al. |
| 7,992,156 | B1 | 8/2011 | Wang |
| 8,233,882 | B2 * | 7/2012 | Rogel ............ 455/411 |
| 8,769,643 | B1 | 7/2014 | Ayed |
| 2004/0006637 | A1 | 1/2004 | Kuacharoen et al. |
| 2005/0108721 | A1 | 5/2005 | Oshima et al. |
| 2005/0108733 | A1 | 5/2005 | Bermudez et al. |
| 2005/0246705 | A1 | 11/2005 | Etelson et al. |
| 2006/0161973 | A1 * | 7/2006 | Royer et al. ............ 726/8 |
| 2008/0034071 | A1 * | 2/2008 | Wilkinson et al. ........ 709/220 |
| 2008/0134347 | A1 * | 6/2008 | Goyal et al. ............ 726/29 |
| 2008/0250400 | A1 | 10/2008 | Vertes |
| 2008/0282266 | A1 | 11/2008 | Kabanov |
| 2009/0164994 | A1 * | 6/2009 | Vasilevsky et al. ........ 718/1 |
| 2009/0227274 | A1 | 9/2009 | Adler et al. |
| 2009/0240947 | A1 * | 9/2009 | Goyal et al. ............ 713/176 |
| 2009/0249335 | A1 * | 10/2009 | Vasilevsky et al. ........ 718/1 |
| 2010/0299719 | A1 | 11/2010 | Burks et al. |
| 2010/0306547 | A1 * | 12/2010 | Fallows et al. ............ 713/178 |
| 2010/0333088 | A1 | 12/2010 | Rogel et al. |
| 2011/0030047 | A1 | 2/2011 | Gao et al. |
| 2011/0219234 | A1 * | 9/2011 | Bogner ............ 713/175 |
| 2011/0252240 | A1 | 10/2011 | Freedman et al. |
| 2011/0276987 | A1 | 11/2011 | Pope et al. |
| 2012/0036552 | A1 | 2/2012 | Dare et al. |
| 2012/0149338 | A1 | 6/2012 | Roundtree |
| 2012/0204126 | A1 | 8/2012 | Yoshimura |
| 2013/0007848 | A1 | 1/2013 | Chaskar et al. |
| 2013/0091543 | A1 * | 4/2013 | Wade et al. ............ 726/1 |
| 2013/0160072 | A1 * | 6/2013 | Reus et al. ............ 726/1 |
| 2013/0239197 | A1 * | 9/2013 | Kato et al. ............ 726/9 |
| 2014/0007048 | A1 * | 1/2014 | Qureshi et al. ............ 717/110 |
| 2014/0007183 | A1 | 1/2014 | Qureshi et al. |
| 2014/0007205 | A1 | 1/2014 | Oikonomou |
| 2014/0032491 | A1 | 1/2014 | Neerincx et al. |
| 2014/0059525 | A1 | 2/2014 | Jawa et al. |
| 2014/0059573 | A1 | 2/2014 | Jawa et al. |
| 2014/0059642 | A1 | 2/2014 | Deasy et al. |
| 2014/0059703 | A1 | 2/2014 | Hung et al. |
| 2014/0289511 | A1 | 9/2014 | Tuch et al. |

OTHER PUBLICATIONS

Riley et al., "Multi-Aspect Profiling of Kernal Rootkit Behavior", ACM, 2009, 14 pages.

Sysmagazine, "Redirection of functions in Mach-O libraries", Sysmagzine, 28 pages, Apr. 2011.

Lozzo, Vincent, "Let Your Mach-O Fly", Black Hat Briefings, Feb. 2009, 42 pages https://www.blackhat.com/presentations/bh-dc-09/lozzo/BlackHat-DC-09-lozzo-Macho-on-the-fly.pdf.

Manish Jawa et al., "Method and System for Facilitating Replacement of System Calls", U.S. Appl. No. 13/756,347, filed Jan. 31, 2013.

Perry Hung et al., "Method and System to Impose Enterprise Security Mechanisms Throughout a Mobile Application Lifecycle", U.S. Appl. No. 13/918,511, filed Jun. 14, 2013.

Manish Jawa et al., "Method and System for Identifying and Replacing System Calls", U.S. Appl. No. 13/775,047, filed Feb. 22, 2013.

Mach-Developer Library—Mach-O Programming Topics, https://developer.apple.com/library/mac/documentation/developertools/conceptual/machotopics/1-articles/indirect_addressing.html, Feb. 2009.

International Search Report and Written Opinion dated Dec. 2, 2013, Application No. PCT/US2013/056675, international filing date of Aug. 26, 2013, 8 pgs.

David Schuetz, "The IOS MDM Protocol," Intrepidus Group, Inc.; Aug. 3, 2011, 29 pgs.

"Over-theAir Profile Delivery Concepts," http://developer.apple.com/library/ios/#documentation/networkinginternet/conceptual/iphoneotaconfiguration/OTASecurity/OTASecurity.html; Feb. 12, 2013, 6 pgs.

"Developer Forums: Retrieving Certificate from Keychain," page 2, https://devforums.apple.com/thread/3336?start=25&start=0; Mar. 20, 2013, 5 pgs.

"Developer Forums: Retrieving Certificate from Keychain," page 1, https://devforums.apple.com/message/11142#11142; Mar. 20, 2013, 13 pgs.

"Verify/Check to see if a Configuration Profile has been installed on iPhone," Careers 2.0 by stackoverflow, http://stackoverflow.com/questions/2195673/verify-check-to-see-if-a-configuration-profile-has-been-installed-on-iphone; Mar. 20, 2013, 2 pgs.

* cited by examiner

METHOD AND SYSTEM FOR FACILITATING ISOLATED WORKSPACE FOR APPLICATIONS

CROSS-REFERENCE TO RELATED APPLICATIONS

This application claims the benefit of U.S. Provisional Patent Application 61/692,857 filed on Aug. 24, 2012 and entitled "Secure Inter-Process Communication and Virtual Workspaces on Mobile Device Operating Systems," which is hereby incorporated by reference.

BACKGROUND

Over the past decade, the mobile device has evolved from a voice-centric device into a mobile personal computer. No longer just a device for voice communications, the mobile device has become a multitasking tool, useful for activities such as emailing and web browsing. The current trends for mobile devices are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device for dedicated enterprise use or carry two devices, one personal and one for enterprise use, to work.

From an end-user perspective, it is desirable to consolidate the personal mobile device with the enterprise device. Virtualization offers an opportunity to provide a convenient solution by preserving isolation of environments without requiring a second physical enterprise device. Supporting a personal environment and a work environment through virtualization on a personal mobile device represents an attractive alternative to existing solutions involving multiple physical mobile devices. The rapid pace of hardware advances in mobile devices over the past several years has led to a class of mobile devices with resources capable of supporting multiple environments (e.g., one or more virtual phones) through virtualization.

However, given the current particular complexities of the mobile environment from technical, infrastructure, and business perspectives, providing sufficient virtualization capabilities on mobile devices remains challenging. For example, mobile service carriers typically do not give enterprises or end users full access to its hardware resources, for security or commercial reasons. In addition, not all mobile-device operating systems are virtualization-friendly. They may not provide sufficient privileged access to the system resources and impose stringent restrictions on the applications. For example, certain operating systems may not allow (or provide limited ability for) more than one process to execute at a time, and may not provide any inter-process call mechanism. Hence, it remains a challenge to unify a user's work-related enterprise functionalities and his personal-use functionalities on the same mobile device.

SUMMARY

One embodiment of the present invention provides a system that maintains an isolated workspace environment of enterprise applications on a mobile device. The system receives enterprise applications for installation on the mobile device, wherein functionality has been injected into the binary executables of the enterprise applications to force the enterprise applications to communicate with an application management agent installed on the mobile device in order to obtain a security policy governing a user's ability to access the enterprise applications. The security policy includes a validity time period value related to keeping the isolated workspace valid. Furthermore, the application management agent provides cryptographic keys to the enterprise applications to share encrypted messages relating to the isolated workspace that are stored on the mobile device. Upon launching, one of the enterprise applications stores a workspace expiration time value as an encrypted message on the mobile device, wherein the workspace expiration time value is a function of the validity time period value and reflects a period of time in which the isolated workspace remains valid. The workspace expiration time value is extended by the launched enterprise application if the user continues to use the launched enterprise application or, by at least one other enterprise application, if the other enterprise application is launched by the user before an expiration of the expiration time value. In addition, the application management agent requests authentication credentials from the user to continue using enterprise applications in the isolated workspace if the workspace expiration time value expires due to a lack of activity by the user of any of the enterprise applications.

In a variation on this embodiment, the application management agent obtains the security policy from a remote server controlled by an enterprise.

In a variation on this embodiment, the shared encrypted messages related to the isolated workspace are stored in a pasteboard of the mobile device that is only known to the enterprise applications and the application management agent.

In a variation on this embodiment, requesting authentication credentials from the user involves presenting a PIN or password lock screen on the mobile device.

In a variation on this embodiment, the inserted functionality further forces the enterprise applications to communicate through a secure data channel in accordance with the security policy.

In a further variation, the secure data channel is a VPN tunnel to a VPN gateway of an enterprise.

In a variation on this embodiment, the enterprise application and the application management agent do not run concurrently and utilize a URL handler of the mobile device to request transfer of execution flow to the other.

BRIEF DESCRIPTION OF THE FIGURES

In the figures, like reference numerals refer to the same figure elements.

DETAILED DESCRIPTION

Figure 1:
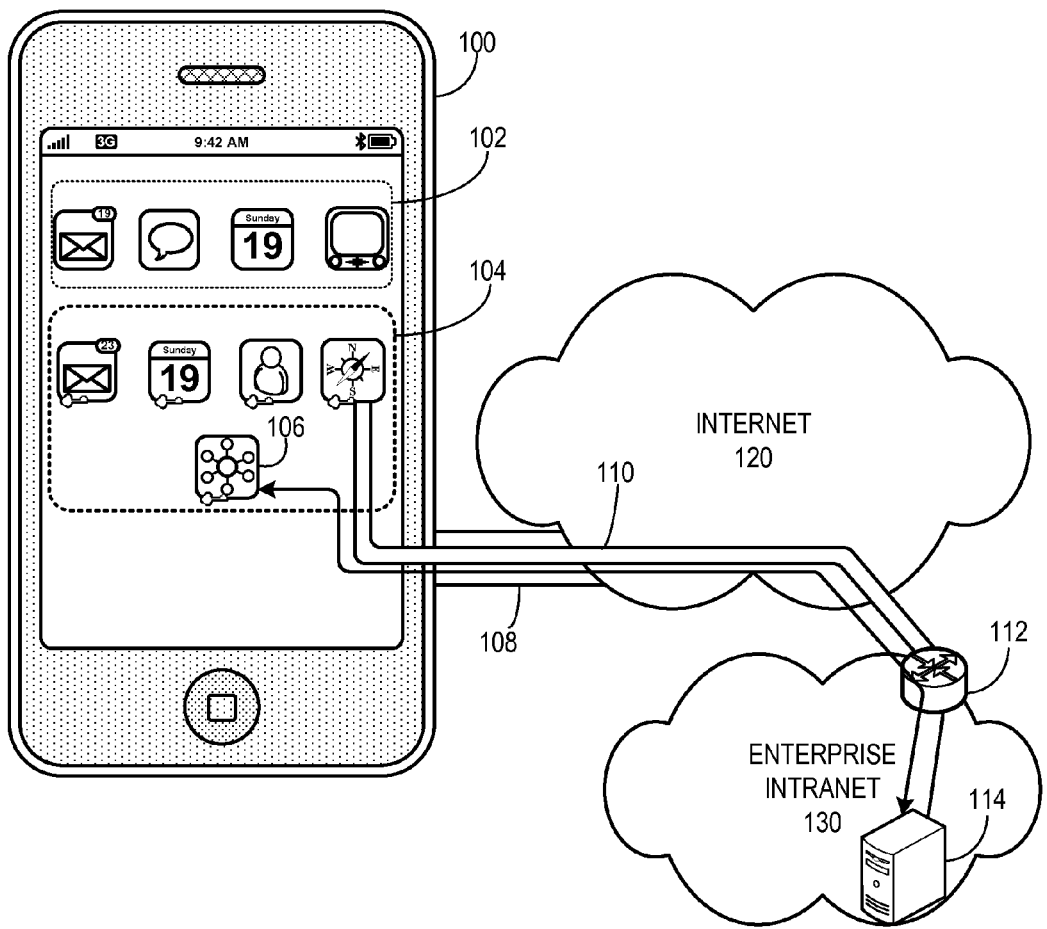
FIG. 1 illustrates an exemplary isolated workspace on a mobile phone, in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.
Overview In embodiments further described herein, the problem of providing a secure and exclusive environment for one or more enterprise applications while still accommodating a user's personal applications on a mobile device is solved by facilitating an isolated workspace for the enterprise applications. Within this isolated workspace, the enterprise applications can enforce enterprise policies, share data, access corporate resources and prevent the user's personal applications on the same device from accessing data and resources shared by the enterprise applications.

Enterprise applications often have stringent security requirements and do not allow unauthorized applications to access their data, which, for example, may be locally stored on the mobile device. On a conventional computer, one can solve this problem by placing the enterprise applications on a virtual machine, which is isolated from the host's operating system. However, as previously discussed, such virtual machines are difficult to implement on mobile devices due to insufficient access to system resources, a limitation often imposed by mobile service carriers or manufacturers for security or commercial purposes. In addition, certain operating systems (such as Apple's iOS) do not easily facilitate concurrent processes, which imposes significant difficulties to virtualization.

Embodiments described herein allow enterprise applications to execute alongside personal applications on the same mobile device without running a conventional virtual machine. These enterprise applications can reside within a secure, exclusive "virtual workspace" that is isolated from other regular applications. In one particular embodiment, the workspace is implemented in part through applications that are modified to enforce enterprise policies and in part through an application management agent on the mobile device that maintains up-to-date enterprise policies. In particular, a modification utility can modify a generic application, which results in a "wrapped" application with substituted system library calls. These substitute system calls, referred to as "wrapper," become part of the application and serve as a policy enforcement mechanism. For example, with a wrapper, certain enterprise applications may communicate with an enterprise intranet via a virtual private network (VPN) tunnel, and may be precluded from using the mobile device's regular, unencrypted data connectivity. The policy enforcement component, or wrapper, of each enterprise application running in the workspace can also require that all the files associated with the enterprise applications are encrypted. In addition, enterprise applications within the workspace can share certain resources, such as a workspace-specific pasteboard or clipboard buffer; but other regular applications on the phone are forbidden from accessing these resources.

The following disclosure uses enterprise applications as examples. However, embodiments of the present application are applicable in any environment where a set of applications (which may or may not be enterprise applications) can benefit from a secure, isolated execution environment. Furthermore, the term "mobile device" can refer to, but is not limited to, mobile phones, personal digital assistant (PDA) devices, tablet computers, and portable computers.
Isolated Workspace As previously discussed, embodiments described herein utilize the concept of a "virtual workspace" to provide isolation between a personal and enterprise environment in a mobile device. Such a workspace provides a secure and exclusive environment in which a collection of enterprise applications execute. For example, an enterprise's IT department may offer certain enterprise applications to enable an employee to access the enterprise's confidential or restricted information using the employee's personal mobile device (e.g., by accessing a remote server controlled by the enterprise or locally storing such information in a secure manner on the mobile device). Examples of such applications include an email application, phone book, document management program, calendar, specialized web browser, and chat/conferencing application. The workplace provides an isolated environment for these enterprise applications to run and prevents unauthorized applications on the same mobile device from accessing the data used by the enterprise applications.

To facilitate this isolated workspace, certain embodiments of enterprise applications satisfy two conditions: (1) they use an exclusive, secure network connection (e.g., VPN, etc.) to access resources at the enterprise (e.g., data, application servers, etc.) and that is not accessible to other applications on the same mobile device; and (2) they can share certain local resources (such as file storage and memory) among themselves, but these resources are not accessible to other applications. As described below, to satisfy these conditions, an enterprise prepares enterprise applications for installation on a mobile device by performing an offline wrapping process on them that replaces or interposes on certain system library calls (typically related with I/O) with customized calls by "injecting" into the enterprise application, for example, dynamically-linked libraries including these customized calls (i.e., these libraries referred to as a "wrapper" around the original enterprise application) or pre-linking with static libraries containing these customized calls. For example, in one embodiment, the enterprise utilizes an offline utility tool to modify the binary executable (e.g., Mach-O file in an Apple iOS embodiment, etc.) of an enterprise application in order to cause the enterprise application to load one or more specified dynamically linked libraries (e.g., .dylib file in an Apple iOS embodiment) when the enterprise application is launched on the mobile device. Such dynamically linked libraries are then included as part of the enterprise application's archive file (e.g., .ipa file in an Apple iOS embodiment). The customized calls included in the dynamically linked libraries can ensure that the application's I/O functions (e.g., network communication and file access) comply with enterprise policies. In addition, a special local application installed on the user's mobile device, referred to herein as an "application management agent," maintains and updates the enterprise policies locally on the mobile device (e.g., by communicating with a remote management server at the enterprise) and, in certain embodiments, also provides an enterprise application catalog for the end user to select, download and install enterprise applications into the workspace of the mobile device.

Note that although the present disclosure uses "workspace" as a shorthand for this isolated and secure execution environment for enterprise applications, "workspace" is only a logical abstraction that refers to a collection of enterprise applications. In actual implementations, there may or may not be an actual displayed workspace on a graphic user interface (such as a folder). In addition, the present disclosure uses the phrase "accessing a workspace" in a generic sense and does not necessarily require a user to access a folder. A user can access a workspace by merely accessing one of the enterprise applications that belongs to the workspace.

FIG. 1 illustrates an exemplary isolated workspace on a mobile device, in accordance with an embodiment. In this example, a mobile device 100 displays its applications as icons on a touch screen. A group of regular (e.g., personal) applications 102 can include, for example, an email program, a text messaging program, a calendar program, or an online video viewing program. Mobile device 100 also displays a set of enterprise applications (denoted by a small key symbol on the lower left corner of each icon) that operate within a workspace 104.

It should be recognized that the display of FIG. 1 is merely exemplary and that in alternative embodiments, visualization of workspace 104 on the screen of mobile device 100 may differ. For example, in one alternative embodiment, icons representing enterprise application operating within workspace 104 may be intermingled with icons for regular or personal applications 102. In other alternative embodiments, icons representing enterprise applications operating within workspace 104 may be separated from icons for regular or personal applications, for example, through the use of a finger swipe action that takes the user from a screen displaying only personal or regular application 102 to a separate screen displaying only enterprise applications in workspace 104. Examples of enterprise applications in workspace 104 include, for example, an enterprise email program, an enterprise calendar program, an enterprise directory, or an enterprise browser. Also included in workspace 104 is an application management agent 106 (as previously discussed), which serves as a local repository of security and access-control policies for all the enterprise applications. For example, application management agent 106 may periodically communicate (e.g., on behalf of or at the request of running enterprise applications) with a remote application management server 114 at the enterprise to obtain up-to-date security and access control policies. It should be recognized that although the embodiment of FIG. 1 depicts an icon on application management agent 106 on the screen of mobile device 100 as an application that is not required to run during the execution of enterprise applications, alternative embodiments may implement application management agent 106 as a service running on mobile device 100 rather than an icon-based application that is launched by the user by selecting an icon on the screen of mobile device 100 (or by other enterprise applications using the mobile operating system's URL handler functionality).

In addition to voice services, as depicted in the embodiment of FIG. 1, mobile device 100 maintains some type of data connectivity 108 to a public network, such as Internet 120. Data connectivity 108 can be a cellular data communication channel or a wireless network connection (WiFi). To facilitate secure communication between enterprise applications operating within workspace 104 and an enterprise intranet 130, an enterprise application may maintain a VPN tunnel 110 to an enterprise gateway router 112. VPN tunnel 110 provides a secure communication channel between an enterprise application and enterprise intranet 130. In one embodiment, as further discussed below, the customized system calls included with an enterprise application (e.g., within the wrapper) are responsible for maintaining a VPN tunnel (such as VPN tunnel 110) and ensuring that all network communication is routed through the VPN tunnel.

Furthermore, since VPN tunnel 110 is specific to a particular enterprise application, VPN tunnel 110 is not available to other applications outside workspace 104. This exclusive availability of VPN tunnel 110 to a particular enterprise application ensures that all data communication from and to the enterprise application operating within workspace 104 is secure and encrypted. In addition, since the VPN tunnels are enterprise application-specific, gateway router 112 can obtain application-specific access history, which in turn enhances the security of intranet 130. Note that although VPN tunnel 110 is established within data connectivity 108 which is available to all applications on mobile device 100, the content carried in VPN tunnel 110 remains confidential and is only accessible to the enterprise application responsible for VPN tunnel 110.

In certain embodiments, application management agent 106 can run on an as-needed basis. That is, application management agent 106 runs only when an enterprise application calls it (e.g., to exchange authentication credentials, cryptographic keys and other data relating to working with the secured workspace, etc.) or when a user launches it. In other embodiments, application management agent 106 can remain running as long as there is at least one enterprise application running (however, this option might not be available in operating systems that do not allow or only provide limited concurrently running processes). Optionally, application management agent 106 can start automatically as a service as part of the boot-up sequence of mobile device 100. Applicant management agent 106 is responsible for maintaining and updating enterprise policies, such as security requirements and access control. In addition, application management agent 106 can, from time to time or on an as-needed basis, communicate with application management server 114, which in one embodiment can reside in enterprise intranet 130. Application management server 114 can distribute updates to the enterprise policies and remotely manage the enterprise applications via application management agent 106.

Managing Applications within the Workspace

In certain embodiments, enterprise applications within workspace 104 comply with the security and isolation requirements and enterprise policies maintained by application management agent 106 and are either (1) applications specifically developed (e.g., using a provided SDK and APIs) to enforce enterprise policies (sometimes referred to as "containerized applications") and (2) conventional, generic applications that have been "wrapped" (as opposed to having been specifically designed) to enforce enterprise policies (sometimes referred to as "wrapper applications"). Containerized applications may include applications developed in-house by the enterprise specifically to be used in the workspace, such as an expense report generating application for the enterprise's sales department or a financial forecasting application for the enterprise's finance team. Wrapped application can be generic applications developed either by the enterprise or third-party vendors, such as email programs, web browsers, and document viewers that have been developed for general use. As previously discussed, in order to create wrapped applications, an enterprise or a developer of an enterprise application can utilize a wrapping utility program or tool to inject wrap generic applications with a policy-enforcement mechanism, which, in one embodiment, involves injecting references to dynamically linked libraries into the application's binary code that replace conventional system calls.

These dynamically linked libraries interpose or otherwise intercept certain of the enterprise applications system calls, forcing the enterprise application to comply with enterprise policies. For example, for communication purposes, the wrapper can replace a conventional system call to generate a TCP/IP socket with a customized call that generates and returns a socket for a VPN tunnel. This way, all data communications initiated by the enterprise application go through the VPN tunnel. Furthermore, the wrapper of the enterprise application may also communicate with the application management agent 106 to obtain the most up-to-date version of the enterprise's policies. In certain embodiments, such policies may have an expiration, thereby causing an enterprise application to periodically update its own copy of the enterprise policy when its own copy has expired.

In certain embodiments, in addition to maintaining enterprise policies, application management agent 106 may also provide an "application store" through which the user of mobile device 100 can peruse, download and install enterprise applications that comply with workspace 104. An application management agent 106 with such application store functionality can receive notifications of application updates and remind the user to update installed applications or alternatively receive notifications to invalidate or disable an installed enterprise application. It should be recognized that alternative embodiments may simply provide a separate mobile application that can be installed on mobile device 100 that is a separate enterprise-specific application store (versus combining the application store functionality into application management agent 106).

Figure 2:
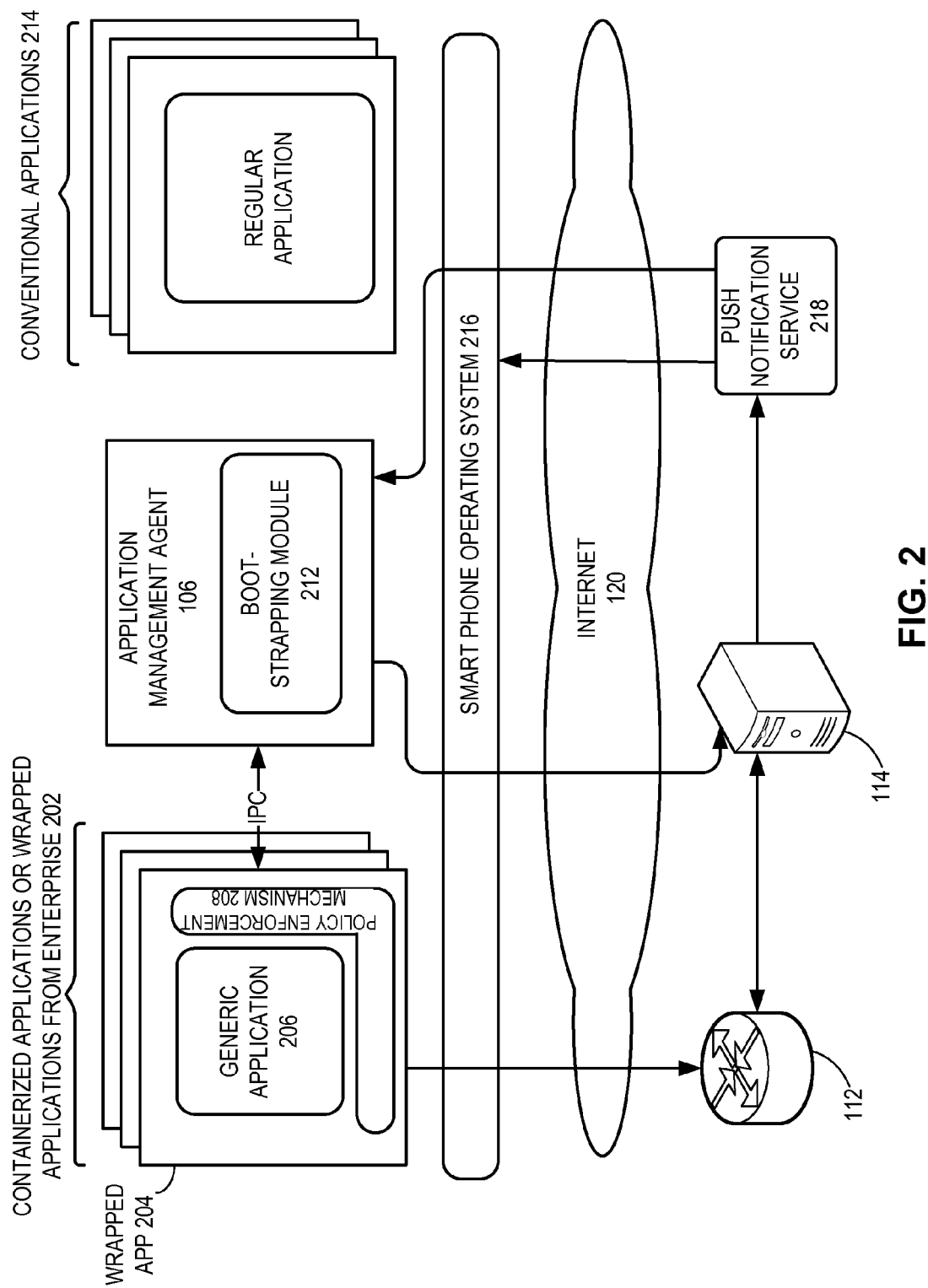
FIG. 2 illustrates an exemplary architecture of a mobile phone that facilitates isolated workspace, in accordance with an embodiment.

FIG. 2 illustrates an exemplary architecture of mobile device 100 that facilitates isolated workspace 104, in accordance with an embodiment. In the embodiment of FIG. 2, the operating system 216 of mobile device 100 supports a set of conventional applications 214 and a set of enterprise applications 202. A wrapped application 204 includes a generic application 206 wrapped with a policy enforcement mechanism 208 (which in one embodiment manifests as a wrapper, as previously discussed, comprising a set of injected dynamic libraries that intercept and replace conventional system calls of generic application 206). Policy enforcement mechanism 208 communicates enterprise policies to wrapped application 204 using, for example, an inter-process communication (IPC) mechanism to obtain such policies from application management agent 106. In a mobile operating system that does not support or provides limited support for concurrently running processes such that traditional IPC is available, the mechanism for wrapped application 204 to communicate with application management agent 106 (as well as other wrapped enterprise applications) may be implemented as a secure and encrypted pasteboard (e.g., utilizing a pasteboard functionality provided by the underlying mobile operating system, such as UIPasteboard in Apple's iOS) that serves as a message-drop-box for two or more communicating applications in workspace 104.

During operation, wrapped enterprise application 204 can communicate with the enterprise network via VPN tunnel 110 terminated at gateway router 112. In one embodiment, policy enforcement mechanism 208 ensures that the network communication for generic application 206 goes through a socket corresponding to VPN tunnel 110. As a result, for example, an web browser application within workspace 104 can browse the enterprise intranet content via the VPN tunnel, and an document viewer within workspace 104 can allow the user to view documents stored on the enterprise's intranet servers. Furthermore, application management agent 106 can communicate with application management server 114, for example, residing at the enterprise, to synchronize its local copy of the enterprise's policies with the most up-to-date version of the enterprise policies. In one embodiment, application management server 114 may push application or policy related update information to application management agent 106 via a push notification service 218, such as, for example, the Apple Push Notification Service (APNS).

Embodiments of application management agent 106 include bootstrapping functionality 212, which performs a series of operations upon an initial installation and launch of application management agent 106 (e.g., which, in certain embodiments, may be downloaded by the user of the mobile device from a public application store such as the Apple App Store) in order to enable enterprise applications to operating within workspace 104. Such operations performed by bootstrapping module 212 can, for example, include authenticating the user to enterprise's remote application management server 114 (e.g., by request the user's corporate based username and password, etc.), requesting the user to create authentication credentials (e.g., password, PIN, etc.) to access workspace 104, generating cryptographic elements (e.g., keys, randomized names, etc.) that can be used and shared with enterprise applications to authenticate enterprise applications to application management agent 106 and secure communications among the enterprise applications and application agent 106 (e.g., by encrypting communications to a pasteboard, etc.), and obtaining an initial version of the enterprise's policies from application management server 114.

Figure 3:
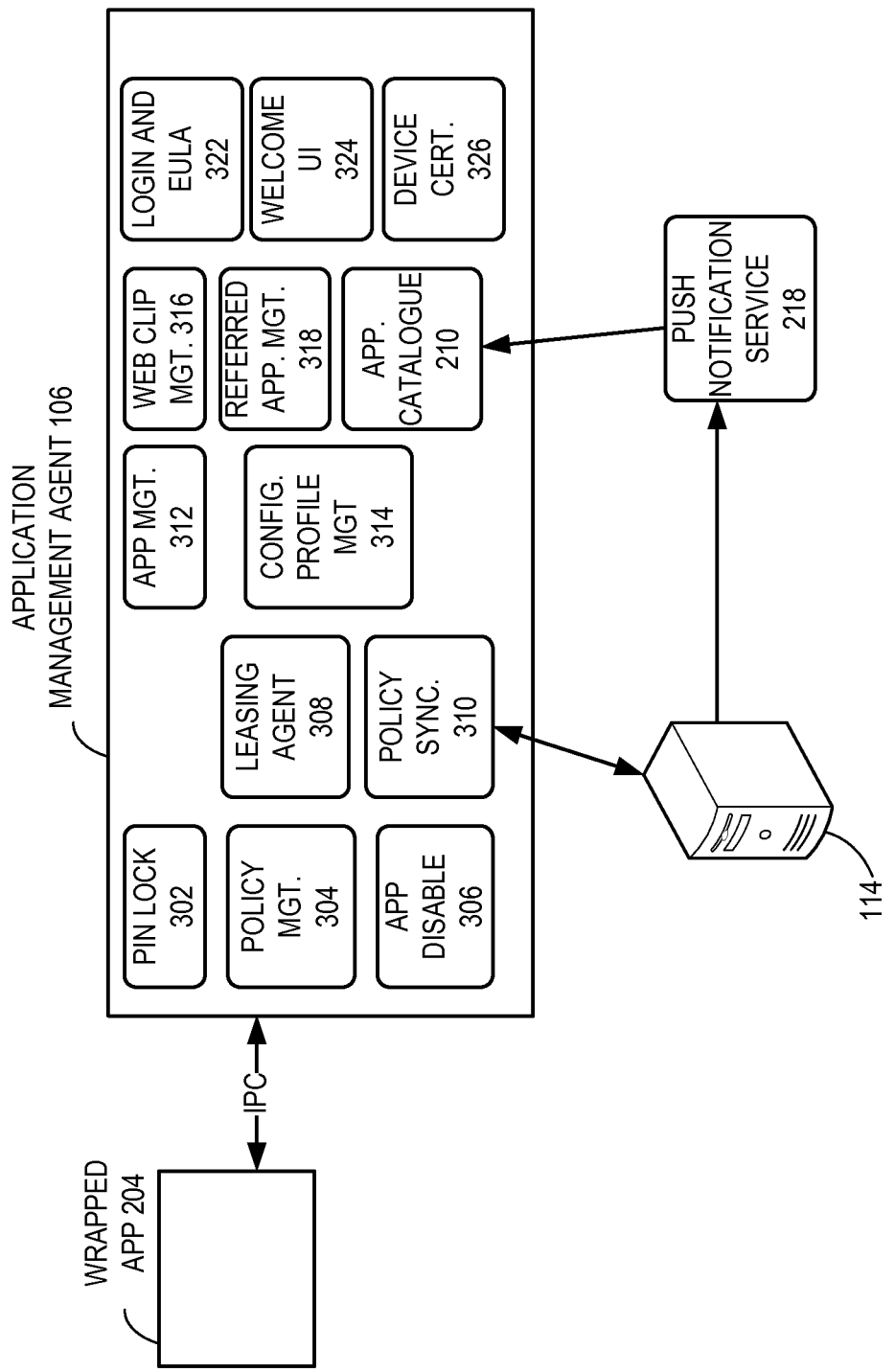
FIG. 3 illustrates an exemplary application management agent that facilitates isolated workspace, in accordance with an embodiment.

Embodiments of application management agent 106 may further include additional functionality, as illustrated in FIG. 3, some of which have been previously discussed. As depicted in the embodiment of FIG. 3, application management agent 106 includes a pin lock functionality 302, a policy management functionality 304, an application disablement functionality 306, a leasing agent 308, a policy synchronization functionality 310, an application management functionality 312, an application configuration profile management functionality 314, a web clip management functionality 316, a referred application management functionality 318, an application catalogue 210, a login and end-user license agreement (EULA) functionality 322, a welcome user interface module 324, and a device certification module 326.

Pin lock functionality 302 authenticates the user when the user uses an enterprise application within workspace 104 for the first time. For example, upon launch of a first enterprise application, the wrapper of the enterprise application may request application management agent 106 initiate workspace 104 (e.g., by invoking application management agent 106 through the mobile operating system's URL handler in one embodiment). In turn, application management agent 106 may present an authentication mechanism to the user through pin lock functionality 302 to authenticate the user before initiating the workspace. The authentication mechanism can be a pin lock, or a more sophisticated mechanism such as digital certificate, password combined with a rolling security token, biometric, or any other mean to obtain an authentication credential from the user. In certain embodiments which implement an expiration time for workspace 104 (e.g., due to inactivity of any enterprise applications for a period of time) or an expiration of the enterprise's policies, pin lock functionality 302 may also be invoked, for example, when the wrapper of a launched enterprise application determines that workspace 104 has expired (e.g., no prior enterprise applications had been active for a period of time) or its local copy of the enterprise's policy has lapsed, thereby requesting application management agent 106 to take action.

Policy management functionality 304 is responsible for implementing received enterprise policies within workspace 104. Examples of enterprise policies can include, for example, requirements for strengths of authentication credentials, time length before expiring a workspace (e.g., and requiring a re-insertion of a PIN or other credential from the user), enablement of certain types of communications among enterprise applications (e.g., pasteboard access, etc.), pin lock requirements, access privileges levels, firewall requirements, encryption requirements, etc.

Application disablement functionality 306 can invalidate or disable installed applications based on notifications from application management server 114. This function is useful when a user is no longer a member of the enterprise and the enterprise IT department needs to revoke the user's access privileges and disable the installed enterprise applications on his personal mobile device 100.

Leasing agent 308 manages lease or expiration times for workspace 104 or for enterprise policies. For example, an enterprise may want to "expire" a workspace after a period of inactivity of enterprise applications. In one embodiment, a workspace validity time value may be written to a secure pasteboard only accessible to enterprise applications in workspace 104. The time value may expire in a specified period of time (per the enterprise policy), however, so long as any enterprise application is currently being used by the user, the wrapper of such enterprise application will continue to extend its validity. When an enterprise application is launched and determines that the workspace validity time value has expired, it will call application management agent 106 (e.g., using the URL handler in one embodiment), which invoked leasing agent 308, and which in one embodiment, may invoke pin lock functionality 302 to obtain authentication credentials from the user before re-validating workspace 104.

Policy synchronization functionality 310 is responsible for communicating with application management server 114 to obtain updated enterprise policies as well as for providing such enterprise policies to enterprise applications on mobile device 100.

Application management functionality 312 manages communications between enterprise applications and application management agent 106. In certain embodiments, such communications implemented through messages exchange through specifically named pasteboards only access to enterprise applications within workspace 104. Such messages may need to be authenticated and decrypted by application management agent 106 through its application management functionality.

Configuration profile management functionality 314 maintains the configuration information for enterprise applications operating within workspace 106. For example, the user may want to limit the storage space consumed by the enterprise applications, or limit the amount of bandwidth available to the enterprise applications.

Web clip management functionality 316 keeps track of the web clips the user places in workspace 106. Web clips are shortcuts to a specific web page, and can be displayed on the user interface as a separate icon.

Referred application management functionality 318 maintains information about applications referred to by another application within the workspace. For example, when an enterprise email program receives an email with an attachment and the user clicks on the attachment, based on the file type of the attachment, referred application management module 318 calls another enterprise application (such as a document viewer) to open and display the attachment.

Application catalogue 210 maintains and displays a list of available enterprise applications. Upon launch of application management agent 106 (e.g., by the user selecting its icon on the screen of mobile device 100), the user can select and install an application from application catalogue 210. In one embodiment, upon selection of an application from application catalog 210, application management agent 106 communicates with remote application management server 114 (or another application server controlled by the enterprise), which may initiate a wrapping process on the selected application and then provide the application to application management agent 106 to install on mobile device 100.

Login and end user license agreement (EULA) management functionality 322 is responsible for presenting to the user the licensing agreement and appropriate legal notices upon user login. In some embodiments, login and (EULA) management module 322 may update the EULA information based on updates received from application management server 114. In certain embodiment, login and EULA management functionality 322 are part of the previously discussed bootstrapping process, securing the user's login credentials for workspace 104 as well as requiring the user to agree to the EULA or other terms of service.

Welcome user interface (UI) functionality 324 may present the user as a "welcome screen" when the user launches and logs into application management agent 106. Welcome UI module 324 can also update the welcome screen based on information received from application management server 114.

Device certification module 326 certifies the smart phone device to ensure that the underlying hardware is allowed to run the workspace. This feature can be desirable when the enterprise IT department wants to restrict the types of hardware to run the workspace, which can reduce the risk of malicious attacks on the hardware level and improve the security of the workspace.

Figure 4:
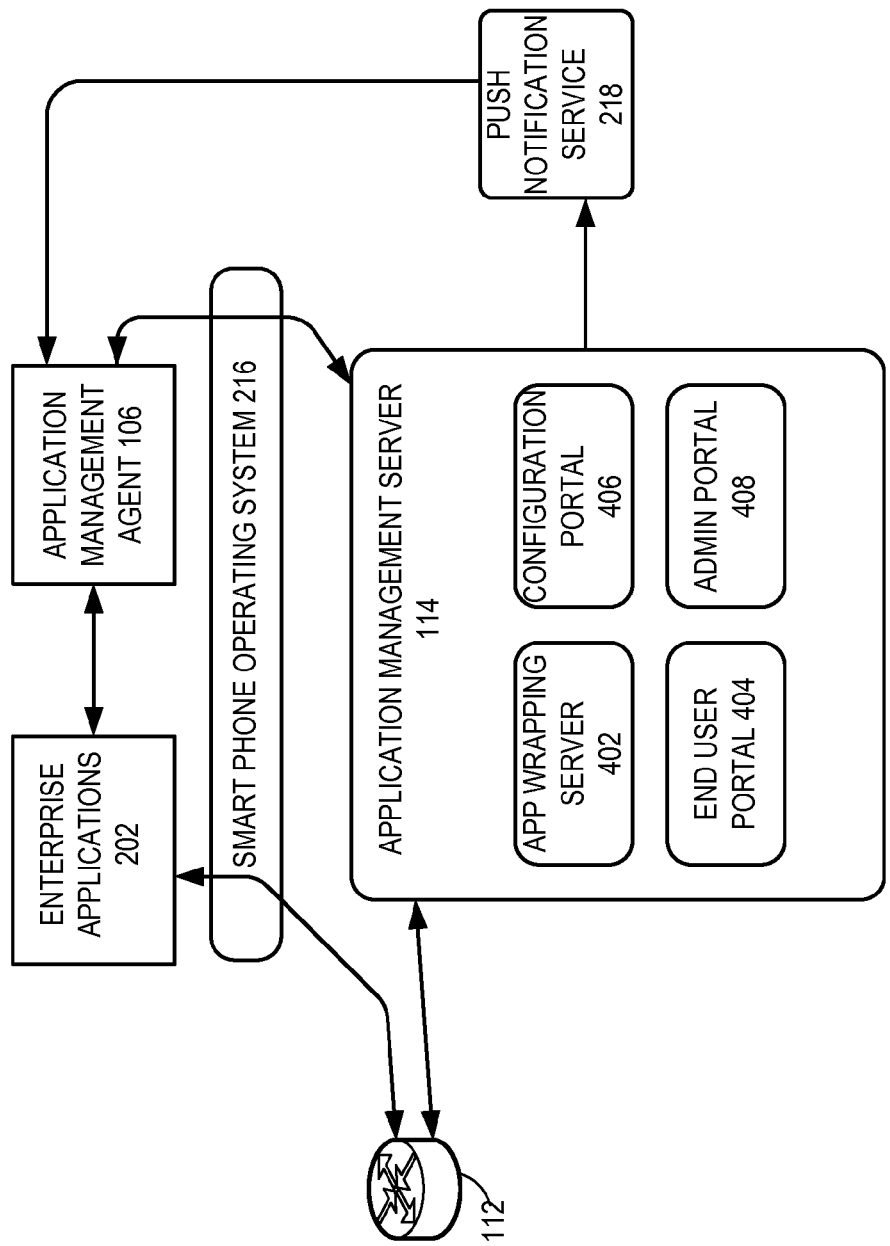
FIG. 4 illustrates an exemplary application management server that facilitates isolated workspace, in accordance with an embodiment.

Application management agent 106 performs many of the aforementioned functions based on information received from the application management server 114. FIG. 4 illustrates an exemplary application management server that facilitates isolated workspace 104, in accordance with an embodiment. In the embodiment of FIG. 4, application management server 114 includes an application wrapping server 402, and end user portal 404, a configuration portal 406, and an administrator portal 408.

Application wrapping server 402 allows the enterprise IT department to wrap any third-party application and turn the third-party application into an enterprise-specific application, which in turn can be listed in application catalogue 210 for the user to install. End user portal 404 allows an end user to log into application management server 114 using any network connection and manage the enterprise applications without using his smart phone. Configuration portal 405 allows an enterprise IT personnel to configure a particular user's enterprise applications, such as setting access control levels and customizing user policies. Administrator portal 408 provides an interface that allows a system administrator to configure application management server 114.

During operation, application management server 114 can communicate with enterprise applications 202 via VPN gateway router 112. Optionally, application management agent 106 may communicate with application management server 114 via a regular data connection (i.e., not via the VPN tunnel). Application management agent 106 can also use this data connection to set up the initial VPN tunnel. Application management server 114 can also provide various notifications to push notification service 218, which in turn pushes these notifications to application management agent 106.

Figure 5:
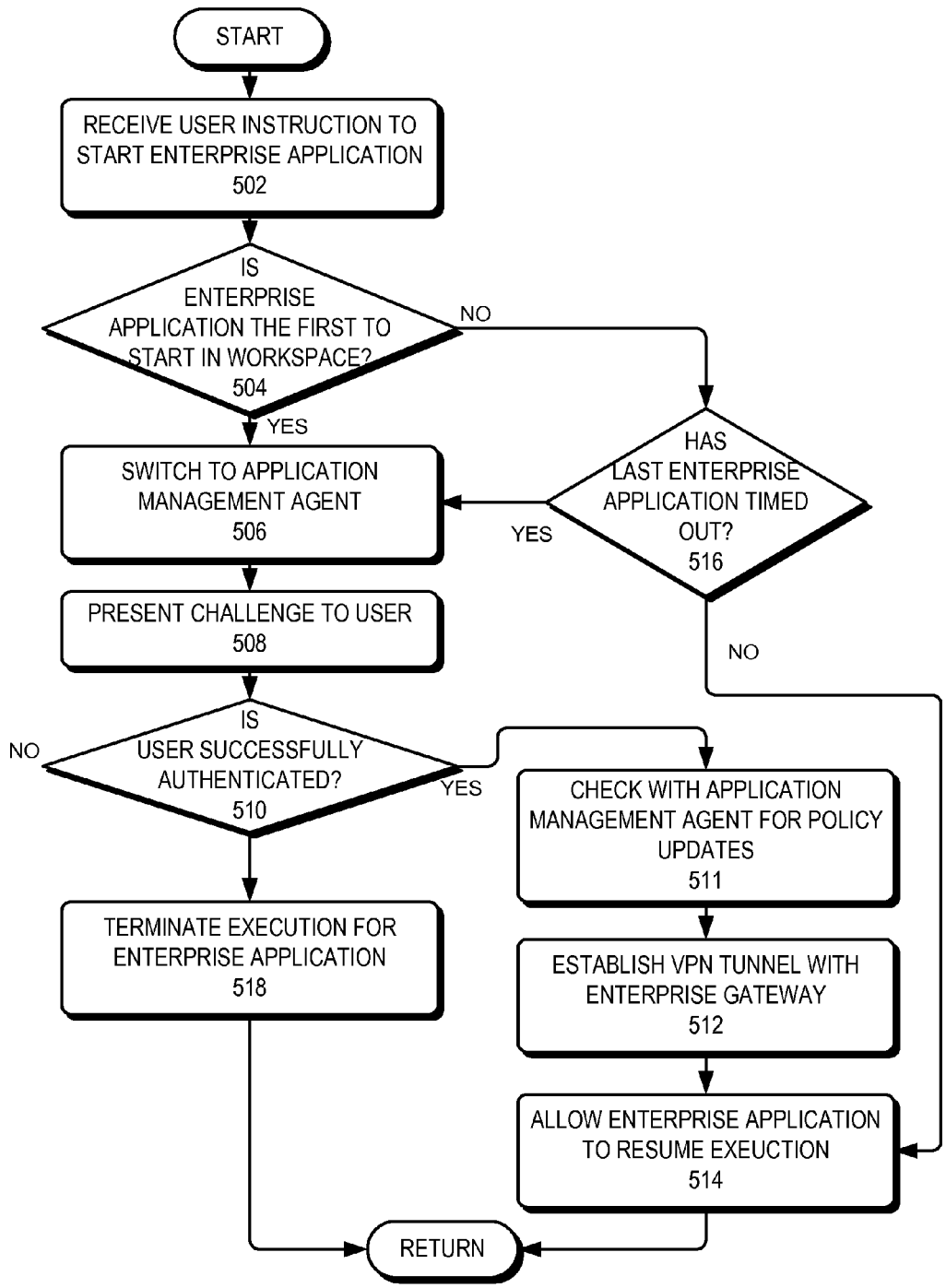
FIG. 5 presents a flowchart illustrating the process of starting an application within an isolated workspace, in accordance with an embodiment.

FIG. 5 presents a flowchart illustrating the process of starting an application within isolated workspace 104, in accordance with an embodiment. During operation, mobile device 100's operating system 216 receives a user instruction to start an enterprise application (operation 502). In response, prior to executing the application, the application's policy enforcement mechanism 208 checks whether the selected enterprise application is the first application to start in workspace 104 by, for example, checking a special file or value which maintains information about all running enterprise applications (operation 504). If the application is the first to start in workspace 104, policy enforcement mechanism 208 requests operating system 216 to switch the execution flow (e.g., invoking the URL handler in one embodiment) to application management agent 106 (operation 506). Subsequently, application management agent 106 may present a challenge (such as a pin lock, via its pin lock module 302) to the user to authenticate the user (operation 508). If the application is not the first to start in workspace 104 (operation 504), policy enforcement mechanism 208 determines whether the last invoked enterprise application has timed out (i.e., has been inactive for more than a predetermined time period) (operation 516). If so, the execution thread switches over to application management agent 106, which subsequently presents the challenge (e.g., pin lock, etc.) to the user (operations 506 and 508). Otherwise, policy enforcement mechanism 208 allows the requested enterprise application to continue its execution (514).

Following operation 508, policy enforcement mechanism 208 determines whether the user is successfully authenticated (operation 510). If the user is authenticated, policy enforcement mechanism 208 optionally establishes a VPN tunnel with the enterprise gateway (operation 512). Subsequently, policy enforcement mechanism 208 allows the enterprise application to resume execution (operation 514). If the user is not authenticated (operation 510), policy enforcement mechanism 208 terminates the execution of the requested enterprise application.

System Architecture

Figure 6:
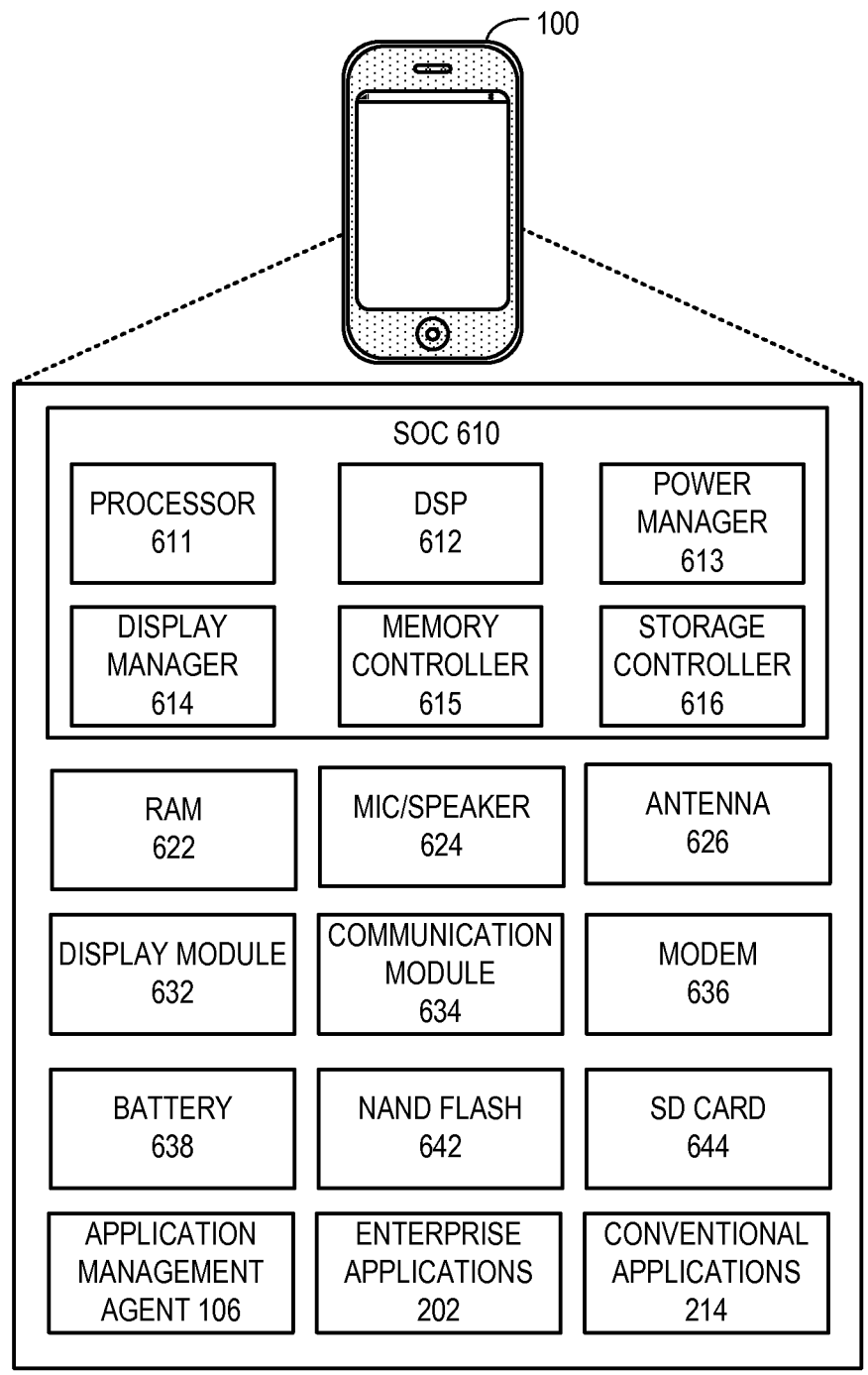
FIG. 6 illustrates an exemplary architecture of a mobile device that supports isolated workspace, in accordance with an embodiment.

FIG. 6 illustrates an exemplary architecture of a mobile device that supports isolated workspace, in accordance with an embodiment. A mobile phone 100 includes a system on a chip (SoC) 610 that provides the basic functionality to the system. SoC 610 includes a processor 611 that executes the operations of system 100. Digital signal processor 612 performs the signal processing, such as analog to digital conversion, for system 100. Power manager 613 controls battery 638. Display manager 614 controls display module 632 and provides display to a user. In some embodiment, display module includes a liquid crystal display (LCD). Memory controller 615 allows processor 611 to access random access memory (RAM) 622. Storage controller 616 provides accesses to internal and external storage of system 700.

Microphone/speaker module 624 allows a user to perform regular voice operations. Communication module 624 uses antenna 626 and modem 636 to connect to a telephone network. NAND flash 642 is the internal storage and SD card 644 is the external storage for system 100. Integrity module 652 performs integrity checks on NAND flash 642 and SD card 644. Application management agent 106 manages enterprise applications 202 and maintains isolated workspace 104. Also included in SoC 610 are a set of conventional applications 214.

Note that the above-mentioned modules can be implemented in hardware as well as in software. In some embodiments, one or more of these modules can be embodied in computer-executable instructions stored in a memory which is coupled to one or more processors in system 100. When executed, these instructions cause the processor(s) to perform the aforementioned functions.

In summary, embodiments of the present invention provide a system and a method for facilitating a secure, isolated workspace for enterprise applications on a user's personal mobile phone. The enterprise application within the workspace enjoy an exclusive VPN connection to the enterprise network, and the system resources such as files and clipboard buffers can only be shared among the enterprise applications themselves and not with any other regular application on the phone. This isolated workspace allows a user to have both personal applications and work-related enterprise applications on the same mobile device without having to worry about data security.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for maintaining an isolated workspace environment of enterprise applications on a mobile device, the method comprising:

receiving enterprise applications for installation on the mobile device, wherein functionality has been inserted into binary executables of the enterprise applications to force the enterprise applications to communicate with an application management agent installed on the mobile device in order to obtain a security policy governing a user's ability to access the enterprise applications, the security policy including a validity time period value related to keeping the isolated workspace valid;

providing by the application management agent, cryptographic keys to the enterprise applications to share encrypted messages relating to the isolated workspace that are stored on the mobile device;

upon launch of one of the enterprise applications, encrypting, by the launched enterprise application, a workspace expiration time value using one of the cryptographic keys provided by the application management agent and storing, by the launched enterprise application, the encrypted workspace expiration time value as an encrypted message on the mobile device, wherein the workspace expiration time value is a function of the validity time period value and reflects a period of time in which the isolated workspace remains valid;

extending the workspace expiration time value by the launched enterprise application if the user continues to use the launched enterprise application or, by at least one other enterprise application, if the other enterprise application is launched by the user before an expiration of the expiration time value; and requesting, by the application management agent, authentication credentials from the user to continue using enterprise applications in the isolated workspace if the workspace expiration time value expires due to a lack of activity by the user of any of the enterprise applications.

2. The method of claim 1, wherein the application management agent obtains the security policy from a remote server controlled by an enterprise.

3. The method of claim 1, wherein the shared encrypted messages related to the isolated workspace are stored in a pasteboard of the mobile device that is only known to the enterprise applications and the application management agent.

4. The method of claim 1, wherein the step of requesting authentication credentials from the user comprises presenting a PIN or password lock screen on the mobile device.

5. The method of claim 1, wherein the inserted functionality further forces the enterprise applications to communicate through a secure data channel in accordance with the security policy.

6. The method of claim 5, wherein the secure data channel is a VPN tunnel to a VPN gateway of an enterprise.

7. The method of claim 1, wherein the enterprise application and the application management agent do not run concurrently and utilize a URL handler of the mobile device to request transfer of execution flow to the other.

8. A non-transitory storage medium storing instructions which when executed by a processor cause the processor to perform a method for maintaining an isolated workspace environment of enterprise applications on a mobile device, the method comprising:

receiving enterprise applications for installation on the mobile device, wherein functionality has been inserted into binary executables of the enterprise applications to force the enterprise applications to communicate with an application management agent installed on the mobile device in order to obtain a security policy governing a user's ability to access the enterprise applications, the security policy including a validity time period value related to keeping the isolated workspace valid;

providing by the application management agent, cryptographic keys to the enterprise applications to share encrypted messages relating to the isolated workspace that are stored on the mobile device;

upon launch of one of the enterprise applications, encrypting, by the launched enterprise application, a workspace expiration time value using one of the cryptographic keys provided by the application management agent and storing, by the launched enterprise application, the encrypted workspace expiration time value as an encrypted message on the mobile device, wherein the workspace expiration time value is a function of the validity time period value and reflects a period of time in which the isolated workspace remains valid;

extending the workspace expiration time value by the launched enterprise application if the user continues to use the launched enterprise application or, by at least one other enterprise application, if the other enterprise application is launched by the user before an expiration of the expiration time value; and requesting, by the application management agent, authentication credentials from the user to continue using enterprise applications in the isolated workspace if the workspace expiration time value expires due to a lack of activity by the user of any of the enterprise applications.

9. The non-transitory storage medium of claim 8, wherein the application management agent obtains the security policy from a remote server controlled by an enterprise.

10. The non-transitory storage medium of claim 8, wherein the shared encrypted messages related to the isolated workspace are stored in a pasteboard of the mobile device that is only known to the enterprise applications and the application management agent.

11. The non-transitory storage medium of claim 8, wherein the step of requesting authentication credentials from the user comprises presenting a PIN or password lock screen on the mobile device.

12. The non-transitory storage medium of claim 8, wherein the inserted functionality further forces the enterprise applications to communicate through a secure data channel in accordance with the security policy.

13. The non-transitory storage medium of claim 12, wherein the secure data channel is a VPN tunnel to a VPN gateway of an enterprise.

14. The non-transitory storage medium of claim 8, wherein the enterprise application and the application management agent do not run concurrently and utilize a URL handler of the mobile device to request transfer of execution flow to the other.

15. A computer system, comprising:
a processor; and
a non-transitory storage medium storing instructions which when executed by the processor cause the processor to perform a method for maintaining an isolated workspace environment of enterprise applications on a mobile device, the method comprising:

receiving enterprise applications for installation on the mobile device, wherein functionality has been inserted into binary executables of the enterprise applications to force the enterprise applications to communicate with an application management agent installed on the mobile device in order to obtain a security policy governing a user's ability to access the enterprise applications, the security policy including a validity time period value related to keeping the isolated workspace valid;

providing by the application management agent, cryptographic keys to the enterprise applications to share encrypted messages relating to the isolated workspace that are stored on the mobile device;

upon launch of one of the enterprise applications, encrypting, by the launched enterprise application, a workspace expiration time value using one of the cryptographic keys provided by the application management agent and storing, by the launched enterprise application, the encrypted workspace expiration time value as an encrypted message on the mobile device, wherein the workspace expiration time value is a function of the validity time period value and reflects a period of time in which the isolated workspace remains valid;

extending the workspace expiration time value by the launched enterprise application if the user continues to use the launched enterprise application or, by at least one other enterprise application, if the other enterprise application is launched by the user before an expiration of the expiration time value; and requesting, by the application management agent, authentication credentials from the user to continue using enterprise applications in the isolated workspace if the workspace expiration time value expires due to a lack of activity by the user of any of the enterprise applications.

16. The computer system of claim 15, wherein the application management agent obtains the security policy from a remote server controlled by an enterprise.

17. The computer system of claim 15, wherein the shared encrypted messages related to the isolated workspace are stored in a pasteboard of the mobile device that is only known to the enterprise applications and the application management agent.

18. The computer system of claim 15, wherein the step of requesting authentication credentials from the user comprises presenting a PIN or password lock screen on the mobile device.

19. The computer system of claim 15, wherein the inserted functionality further forces the enterprise applications to communicate through a secure data channel in accordance with the security policy.

20. The computer system of claim 15, wherein the enterprise application and the application management agent do not run concurrently and utilize a URL handler of the mobile device to request transfer of execution flow to the other.

* * * * *